(12) United States Patent
Rodrigues

(10) Patent No.: US 8,819,264 B2
(45) Date of Patent: Aug. 26, 2014

(54) SYSTEMS AND METHODS FOR DYNAMICALLY SWITCHING BETWEEN UNICAST AND MULTICAST DELIVERY OF MEDIA CONTENT IN A WIRELESS NETWORK

(75) Inventor: Ruchir Rodrigues, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 244 days.

(21) Appl. No.: 13/185,449

(22) Filed: Jul. 18, 2011

(65) Prior Publication Data
US 2013/0024582 A1 Jan. 24, 2013

(51) Int. Cl.
G06F 15/16 (2006.01)
G06F 15/173 (2006.01)
H04L 12/54 (2013.01)
H04L 12/70 (2013.01)

(52) U.S. Cl.
CPC ..... H04L 12/5601 (2013.01); *H04L 2012/5641* (2013.01); *H04L 2012/5642* (2013.01)
USPC ............................. 709/231; 709/223; 709/232

(58) Field of Classification Search
None
See application file for complete search history.

(56) References Cited

U.S. PATENT DOCUMENTS

| | | | |
|---|---|---|---|
| 6,704,576 B1* | 3/2004 | Brachman et al. | 455/503 |
| 7,986,702 B1* | 7/2011 | Reister | 370/401 |
| 8,291,103 B1* | 10/2012 | Reister | 709/231 |
| 2006/0200574 A1* | 9/2006 | Pickens et al. | 709/231 |
| 2006/0200576 A1* | 9/2006 | Pickens et al. | 709/231 |
| 2007/0107026 A1* | 5/2007 | Sherer et al. | 725/97 |
| 2007/0133484 A1* | 6/2007 | Albal et al. | 370/338 |
| 2007/0153820 A1* | 7/2007 | Gould | 370/432 |
| 2007/0168523 A1* | 7/2007 | Jiang et al. | 709/228 |
| 2007/0220573 A1* | 9/2007 | Chiussi et al. | 725/114 |
| 2007/0291661 A1* | 12/2007 | Nishibayashi et al. | 370/252 |
| 2008/0069071 A1* | 3/2008 | Tang | 370/342 |
| 2008/0207137 A1* | 8/2008 | Maharajh et al. | 455/74 |
| 2009/0059832 A1* | 3/2009 | Jhamnani et al. | 370/312 |
| 2009/0081944 A1* | 3/2009 | Yavuz et al. | 455/3.01 |
| 2009/0185522 A1* | 7/2009 | Periyalwar et al. | 370/328 |
| 2009/0198827 A1* | 8/2009 | Hughes | 709/231 |
| 2009/0201929 A1* | 8/2009 | Patel | 370/390 |
| 2009/0217337 A1* | 8/2009 | Åström | 725/115 |
| 2009/0316615 A1* | 12/2009 | Vedantham et al. | 370/312 |
| 2010/0106851 A1* | 4/2010 | Aoki et al. | 709/231 |
| 2010/0115566 A1* | 5/2010 | Haimi-Cohen | 725/94 |
| 2010/0118754 A1* | 5/2010 | Burton et al. | 370/312 |
| 2010/0306810 A1* | 12/2010 | Brooks et al. | 725/109 |
| 2011/0032832 A1* | 2/2011 | Jalali et al. | 370/252 |
| 2011/0083153 A1* | 4/2011 | Cedervall et al. | 725/88 |
| 2011/0228769 A1* | 9/2011 | Haimi-Cohen et al. | 370/390 |
| 2011/0305170 A1* | 12/2011 | Lai et al. | 370/261 |
| 2012/0317225 A1* | 12/2012 | Garg | 709/217 |

\* cited by examiner

*Primary Examiner* — David Lazaro
*Assistant Examiner* — Robert Shaw

(57) ABSTRACT

Systems and methods for dynamically switching between unicast and multicast delivery of media content are disclosed. An exemplary method includes a user device 1) accessing, over a wireless network, a unicast stream carrying data representative of a media content program, 2) detecting, during the accessing of the unicast stream, an instruction to switch to a multicast stream carrying data representative of the media content program, and 3) switching, in response to the instruction, from the accessing of the unicast stream to accessing the multicast stream by way of the wireless network. Corresponding systems and methods are also disclosed.

23 Claims, 13 Drawing Sheets

SYSTEMS AND METHODS FOR DYNAMICALLY SWITCHING BETWEEN UNICAST AND MULTICAST DELIVERY OF MEDIA CONTENT IN A WIRELESS NETWORK

BACKGROUND INFORMATION

As wireless mobile device networks such as mobile phone networks have advanced, more applications and services have been made available over the networks, including applications and services that are increasingly bandwidth intensive. For example, streaming of media content to mobile devices by way of wireless mobile device networks has become commonplace.

Streaming of media content is often accomplished by unicast streaming of the media content. Unicast streaming of media content requires establishment of a unicast connection between a media streaming server and each mobile device to which the media content is streamed. This requirement persists even when the server is streaming the same media content (e.g., the same media content program) to the mobile devices. Consequently, when concurrent demand for particular media content increases and causes the number of unicast connections to increase to satisfy the demand, the resources of the streaming server and the wireless mobile device network can be strained to the point that the quality of services provided over the wireless mobile device network may be adversely affected. Of particular concern are "usage spikes"—periods of time during which there are significant increases in network traffic. Usage spikes, which may be localized or network-wide, may have a variety of causes, including, for example, a large event (e.g., a sporting event or a breaking news event) that leads to a spike in concurrent demand for particular media content. Usage spikes can be debilitating to a wireless mobile device network. In some situations, for example, a usage spike may unintentionally block or otherwise impede, delay, or degrade communications and/or delivery of services over the network.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
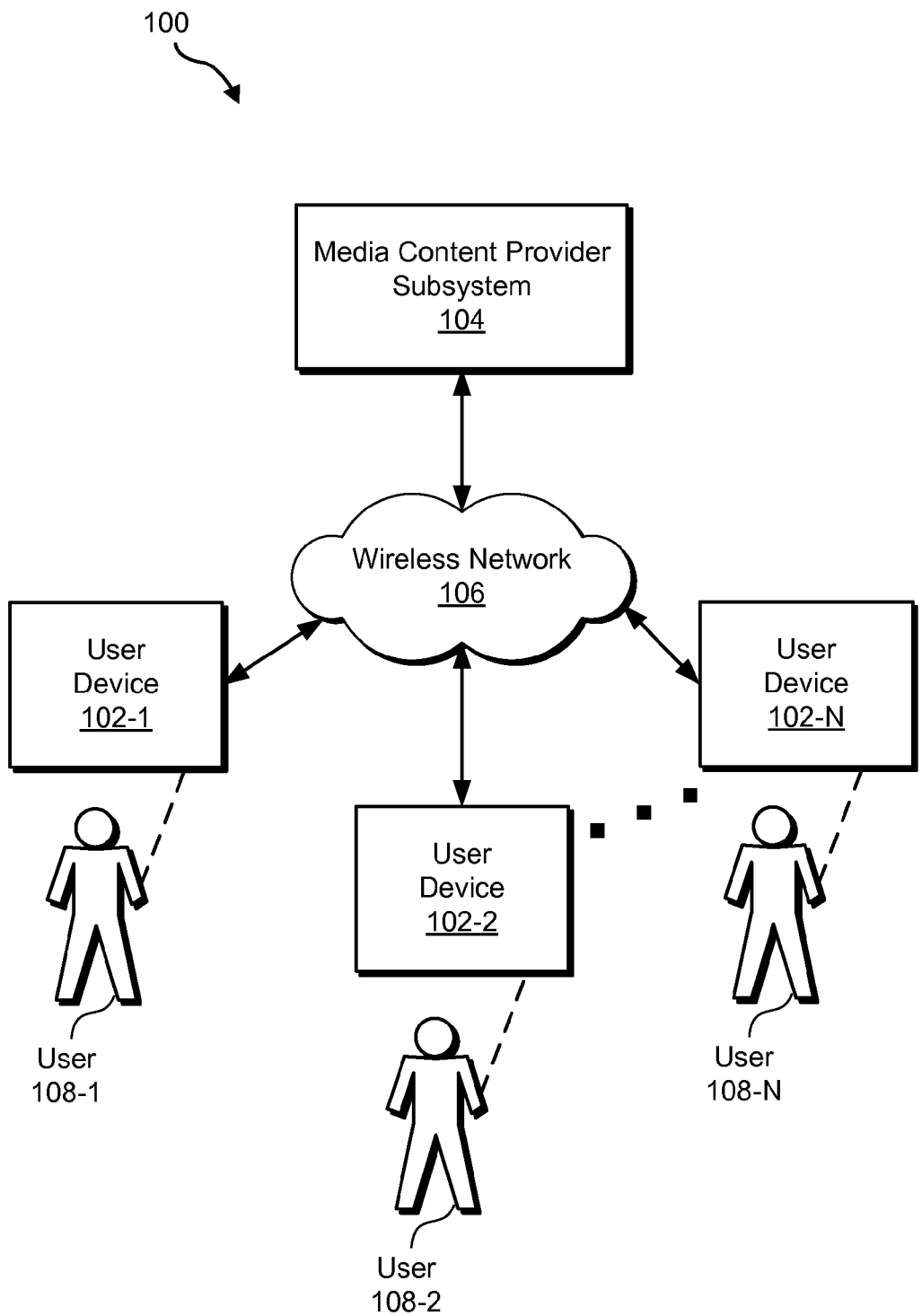
FIG. 1 illustrates an exemplary media content delivery system according to principles described herein.

Exemplary systems and methods for dynamically switching between unicast and multicast delivery of media content are described herein. In certain examples, media content delivery systems and methods described herein may detect a change in concurrent demand for access to media content (e.g., a particular media content program) over a wireless network and dynamically switch between unicast delivery and multicast delivery of the media content over the wireless network in response to the detected change in the concurrent demand for access to the media content.

For example, media content delivery systems and methods described herein may detect an increase in concurrent demand for a media content program to a level that satisfies (e.g., is above) a predefined maximum demand threshold and dynamically switch from unicast delivery to multicast delivery of the media content program over the wireless network in response to the detected increase in concurrent demand for the media content program. Additionally or alternatively, the media content delivery systems and methods described herein may detect a decrease in concurrent demand for a media content program to a level that satisfies (e.g., is below) a predefined minimum demand threshold and dynamically switch from multicast delivery to unicast delivery of the media content program over the wireless network in response to the detected decrease in concurrent demand for the media content program. In this or a similar manner, unicast delivery may be used when concurrent demand for particular media content is relatively low and multicast delivery may be used when concurrent demand for the same media content is relatively high.

By dynamically switching between unicast and multicast delivery of media content based on current concurrent demand for the media content, the systems and methods described herein may efficiently utilize the resources of the wireless network (e.g., the frequency band spectrum of the wireless network) and/or resources of one or more server devices that stream media content over the wireless network. To this end, the systems and methods described herein may use unicast streaming to deliver media content when sufficient resources are available to maintain quality of service given a current level of demand for the media content. Under such network conditions, each user of a user device that accesses the media content by way of a unicast connection may enjoy one or more benefits of the unicast connection, such as individual control over playback of the streamed media content. Similarly, the systems and methods described herein may use multicast streaming to deliver media content when the current level of demand for the media content may otherwise strain network resources and/or jeopardize the quality of service with which the media content and/or other services, data, and/or communications are delivered over the wireless network if unicast streaming were used.

In certain examples, a switch between unicast and multicast delivery of media content is transparent to a user of a user device accessing the media content during the switch. For example, the user device may present the media content for experiencing by the user seamlessly across the switch between unicast and multicast delivery of the media content to the user device.

These and/or other benefits provided by the disclosed exemplary systems and methods will be made apparent herein. Examples of media content delivery systems and methods dynamically switching between unicast and multicast delivery of media content will now be described in reference to the accompanying drawings.

FIG. 1 illustrates an exemplary media content delivery system 100 ("system 100"). As shown, system 100 may include user devices 102 (e.g., user devices 102-1 through 102-N) configured to communicate with a media content provider subsystem 104 ("media subsystem 104") by way of a wireless network 106. As further shown, user devices 102 may be associated with (e.g., operated by) respective users 108 (e.g., users 108-1 through 108-N). The specific associations between users 108 and user devices 102 shown in FIG. 1 are illustrative only. Other associations may exist in other examples. Users 108 are typically end users of one or more services (e.g., a media delivery service provided by media subsystem 104) that may be accessed by user devices 102 over wireless network 106.

User devices 102 may communicate with media subsystem 104 using any suitable wireless communication technologies, including wireless communication technologies that support delivery of media content from media subsystem 104 to one or more user devices 102 over wireless network 106. Examples of such communication technologies may include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), in-band and out-of-band signaling technologies, and other suitable wireless communications technologies, or any combination or subcombination thereof.

Wireless network 106 may include any wireless network provided by one or more appropriately configured network devices (and communication links thereto) and over which media content may be transported from media subsystem 104 to one or more user devices 102. For example, wireless network 106 may include, but is not limited to, a mobile phone network (e.g., a cellular phone network, a 3G network, a 4G network, etc.), a satellite media broadcasting network, a terrestrial media broadcasting networks), a wide area wireless network, and/or any other wireless network capable of transporting media content from media subsystem 104 to one or more user devices 102. Wireless network 106 may include multiple cells serving multiple respective geographic locations. The cells may include geographic cells served by respective base stations and cell towers. In certain exemplary implementations, wireless network 106 may comprise an LTE wireless network.

Wireless network 106 may include one or more network devices located at one or more geographic locations (e.g., at one or more cell towers, base stations, etc.) and configured to perform operations to provide for transport of network traffic over wireless network 106, including transport of data traffic between media subsystem 104 and one or more user devices 102. Examples of network devices may include, but are not limited to, routers, switches, gateways, base station equipment, servers, cell tower equipment (e.g., transceivers), and other network node devices.

Wireless network 106 may be configured to transport both unicast and multicast streams carrying media content from media subsystem 104 to one or more user device 102. To this end, in certain implementations, the frequency band spectrum of wireless network 106 may include a first designated portion (e.g., a first frequency band within the frequency band spectrum) allocated for unicast streaming of media content and other data traffic (e.g., data traffic associated with voice and data communications over wireless network 106) and a second designated portion (e.g., a second frequency band within the frequency band spectrum) allocated for multicast streaming of media content from media subsystem 104 to one or more user devices 102.

Media subsystem 104 may include one or more computing devices (e.g., one or more server devices) configured to perform the functionality of media subsystem 104 described herein. The computing devices may include and/or be implemented by one or more network devices of wireless network 106 and/or may be configured to communicate with one or more network devices of wireless network 106. In certain examples, the computing devices may be operated by the operator of wireless network 106.

Media subsystem 104 may be configured to process and transmit media content over wireless network 106. Processing of media content by media subsystem 104 may include performance of any operations that may prepare media content for transmission over wireless network 106. Examples of such operations may include receiving media content from one or more media content sources, transcoding media content, decoding media content, encoding media content, buffering media content, multiplexing media content, downconverting media content, upconverting media content, performing digital rights management operations, and/or performing any other operations that may prepare media content for transmission over wireless network 106.

As used herein, the term "media content" may refer to any digitally represented media content that may be transmitted (e.g., streamed) by media subsystem 104 over wireless network 106 for access by one or more user devices 102. The term "media content program" may refer to any television program (e.g., a television program), on-demand media program, pay-per-view media program, IPTV program, video program, streamed media program, movie, audio program, song, or any other discrete instance of media content that may transmitted (e.g., unicast and/or multicast streamed) by media subsystem 104 over wireless network 106 for access and processing by one or more user devices 102, which may present media content programs for experiencing by user 108 of user devices 102.

Media subsystem 104 may be configured to transmit media content over wireless network 106 by unicast streaming and/or multicast streaming of the media content over wireless network 106. As used herein, "unicast streaming" includes any point-to-point based transmission of media content, such as a streaming of media content over a unicast connection between media subsystem 104 and a particular user device 102. For unicast streaming of media content, a separate unicast connection is established between media subsystem 104 and each user device 102 to which the media content is to be transmitted. In certain examples, media subsystem 104 may be configured to unicast stream media content within a portion of the frequency band spectrum of wireless network 106 that has been allocated for unicast streaming of media content and transport of other data traffic (e.g., data traffic associated with voice and data communications over wireless network 106) over wireless network 106.

As used herein, "multicast streaming" includes any point-to-multipoint based transmission of media content, such as a transmission of media content stream from media subsystem 104 over wireless network 106 for access by multiple user devices 102. Multicast streaming may include broadcast streaming in which media content is broadcast across the entire wireless network 106 or part of the wireless network 106 (e.g., within one or more specific cells of wireless network 106) such that the broadcast stream may be concurrently accessed by multiple user devices 102. Additionally or alternatively, multicast streaming may include targeted streaming in which media content is streamed over wireless network 106 for access by multiple specific, targeted user devices 102. For targeted multicast streaming of media content, a single stream of media content may be transmitted from media subsystem 104 for distribution across wireless network 106 and access by multiple targeted user devices 102. In certain examples, media subsystem 104 may be configured to multicast stream media content within a second portion of the frequency band spectrum of wireless network 106 that has been allocated for multicast streaming of media content over wireless network 106.

Any suitable technologies may be employed by system 100 for unicast and multicast streaming of media content by media subsystem 104 over wireless network 106. With respect to unicast streaming, for example, technologies such as User Datagram Protocol ("UDP"), Real-time Transport Protocol ("RTP"), Real-time Streaming Protocol ("RTSP"), Hypertext Transfer Protocol ("HTTP"), and/or other suitable technologies may be employed. With respect to multicast streaming, for example, technologies such as Multimedia Broadcast Multicast Service ("MBMS"), MediaFLO, Digital Video Broadcasting Handheld ("DVB-H"), Digital Video Broadcasting Satellite to Handheld ("DVB-SH"), Digital Video Broadcasting Next Generation Handheld ("DVB-NGH"), Digital Video Broadcasting Terrestrial ("DVB-T"), Digital Video Broadcasting Internet Protocol Datacasting ("DVB-IP DC"), Advanced Television Systems Committee—Mobile/Handheld ("ATSC-M/H"), and/or other suitable technologies may be employed.

In certain examples, media subsystem 104 may transmit "live" media content over wireless network 106. As used herein, "live" media content includes media content transmitted in accordance with a predefined schedule. For example, live media content may include live media content programs (e.g., live television, video, and/or audio programs) unicast and/or multicast in accordance with a predefined transmission schedule (e.g., a live television programming schedule).

Media subsystem 104 may be configured to monitor current user demand for media content provided by media subsystem 104. The monitoring may be performed in any suitable way. For example, media subsystem 104 may be configured to monitor a number of users and/or user devices currently accessing and/or requesting access to a particular media content program, a number of unicast streams that are being transmitted by media subsystem 104 and that carry the media content program, a number of user devices 102 accessing a multicast stream, and/or resources (e.g., resources of media subsystem 104 and/or bandwidth and/or other resources of wireless network 106) being used to deliver the media content program.

Media subsystem 104 may be further configured to compare detected current demand for media content to one or more predefined demand thresholds. To this end, media subsystem 104 may maintain data representative of one or more media content demand thresholds, which may include a minimum and/or a maximum demand threshold to which current demand may be compared. A demand threshold may be defined in any suitable way, including without limitation, a predefined number of unicast streams carrying the same media content, a predefined combined bandwidth usage of the unicast streams carrying the media content, and/or a predefined number or user devices accessing the media content (e.g., accessing unicast streams or a multicast stream carrying the media content). Values of demand thresholds may be predefined as may suit a particular implementation.

Media subsystem 104 may be configured to perform one or more operations based on a result of a comparison of a detected current demand for media content to one or more predefined demand thresholds. As an example, during operation in a unicast mode (i.e. during unicast streaming of a media content program over wireless network 106), media subsystem 104 may detect that current demand by user devices 102 for unicast streams carrying data representative of a media content program satisfies a predefined maximum demand threshold. In response, media subsystem 104 may switch from operating in unicast mode (i.e., a low concurrent demand mode) to operating in multicast mode (i.e., a high concurrent demand mode) with respect to the media content program. For example, media subsystem 104 may switch from unicast streaming to multicast streaming of the media content program over wireless network 110. The switch may include media subsystem 104 transmitting, over wireless network 106, a multicast stream carrying data representative of the media content program. In some examples, the transmission of the multicast stream may include broadcasting a broadcast stream within at least one cell of wireless network 110 (e.g., within a particular cell in which the demand for the media content program satisfies the predefined maximum demand threshold). The switch may further include providing, over wireless network 106 to one or more of user devices 102, an instruction to switch from accessing the one or more unicast streams carrying the media content program to accessing the multicast stream carrying the media content program. In some examples, the instruction may be provided by media subsystem 104 inserting the instruction in one or more unicast streams carrying the media content program before transmission of the unicast streams to the one or more user devices 102. The unicast streams may then be transmitted by media subsystem 104 and received by the one or more user devices 102, which may be configured to detect the switch instruction as described below. In addition, the switch may include media subsystem 104 terminating transmission of the one or more unicast streams and the associated unicast connections.

As another example, during operation in multicast mode (i.e., during multicast streaming of a media content program over wireless network 106), media subsystem 104 may detect that current demand by user devices 102 for a media content program satisfies a predefined minimum demand threshold (e.g., that the demand for the media content program has subsided below the predefined minimum demand threshold). In response, media subsystem 104 may switch from operating in multicast mode (i.e., a high concurrent demand mode) to operating in unicast mode (i.e., a low concurrent demand mode) with respect to the media content program. For example, media subsystem 104 may switch from multicast streaming to (back to in some examples) unicast streaming of the media content program over wireless network 110. The switch may include media subsystem 104 providing, over wireless network 106 to one or more of user devices 102 accessing a multicast stream carrying the media content program, an instruction to switch from accessing the multicast stream to accessing one or more new unicast streams that will carry the media content program. In some examples, the instruction may be provided by media subsystem 104 inserting the instruction in the multicast stream carrying the media content program before transmission of the multicast stream over wireless network 110. The multicast stream may then be transmitted by media subsystem 104 and accessed by the one or more user devices 102, which may be configured to detect the switch instruction as described below. In response to the instruction, user devices 102 may request access to unicast streams carrying the media content. Media subsystem 104 may receive the requests and, in response, transmit unicast streams carrying the media content program to the requesting user devices 102. In addition, media subsystem 104 may terminate transmission of the multicast stream carrying the media content program.

In certain examples, a switch between unicast and multicast delivery of media content may include media subsystem 104 generating and using stream access information to facilitate transitions of one or more user devices 102 between accessing unicast and multicast streams. For a switch from unicast delivery to multicast delivery of a media content program, for example, media subsystem 104 may generate a switch map that includes access information (e.g., a Uniform Resource Locator ("URL"), IP address, or other address) for a unicast stream carrying the media content program and access information (a URL, IP address, or other address) for a multicast stream carrying the media content program. The switch map may represent a mapping between the access information for the unicast stream and the access information for the multicast stream carrying the media content program.

Media subsystem 104 may utilize the switch map to provide stream access information to user devices 102 requesting access to the multicast stream as part of the switch from unicast delivery to multicast delivery of the media content program. To illustrate, after media subsystem 104 provides an instruction to switch from accessing a unicast stream to accessing a multicast stream carrying the media content program, media subsystem 104 may receive a request from a user device 102 to access the multicast stream. The request may include data representative of access information for the unicast stream as a parameter. Media subsystem 104 may use the access information for the unicast stream to access the switch map and locate the access information for the corresponding multicast stream. Media subsystem 104 may then provide the access information for the multicast stream to the user device 102 in response to the request, and the user device 102 may utilize the access information to access the multicast stream.

For a switch from multicast delivery to unicast delivery of a media content program, media subsystem 104 may generate a switch map that includes access information (e.g., a URL, IP address, or other address) for a multicast stream carrying the media content program and access information (a URL, IP address, or other address) for a new unicast stream that will carry the media content program. The switch map may represent a mapping between the access information for the multicast stream and the access information for the unicast stream.

Media subsystem 104 may utilize the switch map to provide access information to user devices 102 requesting access to unicast streams as part of the switch from multicast delivery to unicast delivery of the media content program. To illustrate, after media subsystem 104 provides an instruction to switch from accessing a multicast stream to accessing a unicast stream that will carry the media content program, media subsystem 104 may receive a request from a user device 102 to access a new unicast stream carrying the media content program. The request may include data representative of access information for the multicast stream as a parameter. Media subsystem 104 may use the access information for the multicast stream to access the switch map and locate access information for the corresponding unicast stream. Media subsystem 104 may then provide the access information for the unicast stream to the user device 102 in response to the request, and the user device 102 may utilize the access information to access the unicast stream.

Media subsystem 104 may provide a switch instruction to user devices 102 over wireless network in any suitable way, including by in-stream or out-of-stream delivery of the switch instruction. In certain implementations, for example, dynamic switching between unicast and multicast delivery of a media content program may include using an in-stream instruction to instruct one or more user devices 102 accessing the media content program to switch between accessing the media content program by way of unicast delivery and accessing the media content program by way of multicast delivery. As used herein, an "in-stream" instruction refers to an instruction included within a media content carrying stream that is streamed by media subsystem 104 over wireless network 106 for access and use by one or more user devices 102 to access and process the media content carried in the stream.

For in-stream delivery of a switch instruction, media subsystem 104 may be configured to provide a switch instruction to one or more user devices 102 by inserting the switch instruction into a unicast or multicast stream before transmission of the stream over wireless network 106. The switch instruction may be inserted in any suitable way. For example, media subsystem 104 may insert the switch instruction during encoding or digital rights management operations performed before transmission of the stream.

The switch instruction may be inserted at any suitable location and in any suitable data format within the stream. For example, the switch instruction may be inserted within a media transport stream (e.g., an MPEG stream), a media bit stream, a video stream (e.g., an elementary video stream), an audio stream (e.g., an elementary audio stream), an elementary data stream (e.g., a closed captioning stream), a transport stream envelope, a stream header, or any other location within a media content stream. In certain implementations, the switch instruction may consist of a value of a single bit within the stream, and the insertion of the switch instruction may include changing the value of the bit.

In-stream delivery of a switch instruction to user devices 102 may be beneficial for a number of reasons. For example, network resources may be conserved by not using a separate out-of-stream communication to each user device 102. As another example, in-stream delivery may be especially efficient for instructing user devices 102 accessing a multicast stream to switch to accessing unicast streams because media subsystem 104 may instruct the user devices 102 accessing the multicast stream without obtaining or maintaining information to identify specific user devices 102 accessing the multicast stream.

Figure 2:
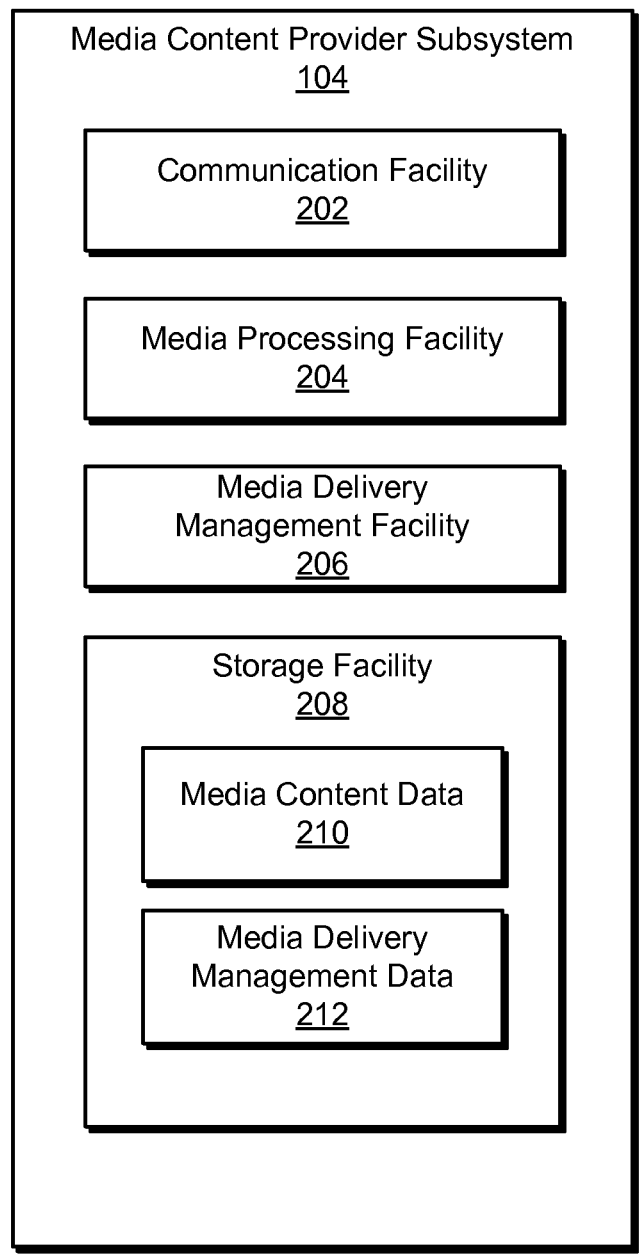
FIG. 2 illustrates exemplary components of a media content provider subsystem according to principles described herein.

FIG. 2 illustrates exemplary components of media subsystem 104. As shown, media subsystem 104 may include a communication facility 202, a media processing facility 204, a media delivery management facility 206, and a storage facility 208, which may be in communication with one another using any suitable communication technologies.

Communication facility 202 may be configured to facilitate communications between media subsystem 104 and user devices 102 using any communication technologies suitable to support the functionality of media subsystem 104 described herein, including any of the exemplary communication technologies described above that may be used for transmitting media content streams to user devices 102 and otherwise communicating with user devices 102 by way of wireless network 106.

Media processing facility 204 may be configured to process media content, including by performing any of the exemplary media processing described herein on media content received from one or more media content sources to prepare the media content for delivery to one or more user devices 102. Media processing facility 204 may be further configured to process media content by generating and transmitting unicast and multicast streams carrying media content to one or more user devices 102 over wireless network 106.

Media delivery management facility 206 may be configured to manage delivery of media content from media subsystem 104 over wireless network 106. For example, media delivery management facility 206 may be configured to monitor current demand for access to media content, compare the current demand for media content to one or more predefined demand thresholds, and dynamically switch between unicast and multicast delivery of media content based on the result of the comparison(s), such as described herein. To this end, media delivery management facility 206 may be configured to generate and/or maintain information about media content streams being transmitted by media subsystem 104, predefined demand threshold information, and media content stream access information (e.g., URLs, IP addresses, or other addresses at which media content streams may be accessed by user devices 102).

Media delivery management facility 206 may be configured to communicate with media processing facility 204 to facilitate performance of one or more operations of media delivery management facility 206. For example, media delivery management facility 206 may communicate with media processing facility 204 to determine a current demand level for a media content program (e.g., by obtaining data indicating a number of unicast streams carrying the media content program that are currently being transmitted to and/or requested by user devices 102) and/or to switch between unicast and multicast delivery of media content, such as by directing media processing facility 204 to insert an in-stream switch instruction into a multicast stream or unicast streams carrying the media content program in order to provide the switch instruction to appropriate user devices 102 that are accessing the media content program.

Storage facility 208 may be configured to maintain media content data 210 representative of media content processed by media processing facility 204. Storage facility 208 may be further configured to maintain media delivery management data 212 representative of information generated and/or maintained by media delivery management facility 206 in relation to managing delivery of media content by media subsystem 104 (e.g., data representative of detected current demand for media content, predefined demand thresholds, stream access information, and/or one or more switch maps). Storage facility 208 may maintain additional or alternative data, including any of the data disclosed herein.

Returning to FIG. 1, user devices 102 may include or be implemented by any computing devices configured to access wireless network 106 and/or one or more services provided over wireless network 106, including accessing media content distributed through a media content service provided by media subsystem 104 over wireless network 106. Examples of user devices 102 may include, but are not limited to, wireless communication devices, mobile communication devices (e.g., mobile phones, smart phones, etc.), personal digital assistants, personal computers (e.g., laptop computers, tablet computers, etc.), vehicular communication devices, and media access and/or player devices. User devices 102 may include end-user access devices associated with end users such as subscribers to one or more services provided over wireless network 106.

User devices 102 may be configured to access media content streams carrying data representative of media content over wireless network 106. In particular, user devices 102 may be configured to access unicast and multicast streams of media content over wireless network 106. In certain embodiments, a user device 102 may be configured to receive media content streams over different frequency band spectrums of wireless network 106. For example, user device 102 may include a radio chipset that is configured to receive unicast streams over a first frequency band spectrum and multicast streams over a second frequency band spectrum of wireless network 106. In certain embodiments, a user device 102 may be configured to concurrently receive both a unicast stream and a multicast stream for at least a brief period of time (to allow buffered content to be used to effectuate a seamless transition from one type of stream to another as described herein). In other embodiments, a user device 102 may be configured to receive only one stream at a time.

User devices 102 may process accessed streams and the media content carried therein. For example, user devices 102 may present the media content for experiencing by users 108 of user devices 102, such as by playing back a media content program. User devices 102 may access and present media content carried in media content streams received from media subsystem 104 over wireless network 106 in any suitable way.

User devices 102 may be configured to detect an instruction to dynamically switch from accessing one type of media content stream to accessing another type of media content stream. The switch instruction may be detected by user devices 102 in any suitable way. For example, the switch instruction may be received from media subsystem 104 as part of one or more media content streams (i.e., within the streams) being received by user devices 102 or in one or more out-of-stream messages received from media subsystem 104. In certain implementations, user devices 104 may be configured to monitor a media content stream for the switch instruction. For instance, user devices 104 may be configured to parse the media content stream, or a specific part of the media content stream, being received from media subsystem 104 to detect the switch instruction within the media content stream.

In response to detection of the switch instruction, user devices 104 may dynamically switch from accessing one type of media content stream to accessing another type of media content stream carrying the same media content by way of wireless network 106. As an example, a user device 102 may access a unicast stream carrying data representative of a media content program, detect, during the accessing of the unicast stream, an instruction to switch to a multicast stream carrying data representative of the media content program, and switch, in response to the instruction, from accessing the unicast stream to accessing the multicast stream by way of wireless network 106. As another example, a user device 102 may access a multicast stream carrying data representative of a media content program, detect, during the accessing of the multicast stream, an instruction to switch to a unicast stream carrying data representative of the media content program, and switch, in response to the instruction, from accessing the multicast stream to accessing the unicast stream by way of wireless network 106.

The switch may be performed by user device 102 in any suitable way, including any way that makes the switch transparent to a user 108 of user device 102. For example, the user device 102 may present the media content program for experiencing by the user 108, and the switch may be performed in such a way that the presentation of the media content program is seamless across the switch. To illustrate, during the accessing of the unicast stream, the user device 102 may use data representative of the media content program that is carried by the unicast stream to present a first segment of the media content program. The user device 102 may switch from accessing the unicast stream to accessing the multicast stream. During the accessing of the multicast stream, the user device 102 may use data representative of the media content program that is carried by the multicast stream to present a second segment of the media content program. The switch may be performed seamlessly and transparently such that the presentation of the media content program is seamless across and not interrupted by the switch from the unicast stream to the multicast stream.

In certain examples, the user device 102 may be configured to buffer the unicast and/or multicast streams and use buffered stream content to effectuate a seamless and dynamic transition from accessing one type of stream to accessing another type of stream. For example, when the user device 102 is receiving a unicast or multicast stream, the user device 102 typically, in high bandwidth networks, buffers the stream content at a rate that is faster than the rate at which the content is played back for experiencing by a user. The buffered content may be used to effectuate a seamless transition from accessing one type of stream to accessing another type of stream.

To illustrate, the user device 102 may receive a unicast stream and buffer the stream content at a rate that is faster than the rate at which the content is played back. During playback of the content, the user device 102 may receive an instruction to switch from accessing the unicast stream to accessing a multicast stream carrying the same content. The user device 102 may respond by switching and accessing the multicast stream in any of the ways described herein. Because the user device 102 has buffered unicast stream content ahead of the playback of the content, the user device 102 may use either the buffered content of the unicast stream or the content carried by the multicast stream now being accessed by the user device 102 for playback of the content until the end of the buffered content, at which point the user device 102 will exclusively use the content carried by the multicast stream. This gives the user device 102 sufficient time to temporally align unicast stream content and multicast stream content such that the user device 102 is able to effectuate the switch from accessing the unicast stream to accessing the multicast stream in a way that allows a presentation of media content to be seamless across the switch.

The user device 102 may leverage sequenced frames included in the media content to temporally align unicast stream content and multicast stream content. For example, each frame of a media content program (e.g., a video program) may include a sequence number, which may be used by the user device 102 to assemble received frames in an appropriate sequential order for playback. The frame sequence numbering of the media content program is the same whether the media content program is carried by a unicast stream or a multicast stream. Accordingly, the user device 102 may use the sequence numbers of the frames to ensure that a playback of a media content program is seamless across a switch between accessing a unicast stream and a multicast stream carrying the media content program.

To illustrate, an exemplary media content program may include one hundred frames sequentially numbered from one to one hundred. The user device 102 may receive a unicast stream carrying the media content program, buffer the media content program, and play back the media content program. At a given point during this process, the user device 102 may have buffered through frame sixty-five and played back through frame fifty-five of the media content program. At this point, the user device 102 may detect an instruction (e.g., within and/or beginning at frame fifty-five) to switch from accessing the unicast stream to accessing a multicast stream carrying the media content program. The user device 102 may respond by switching and accessing the multicast stream in any of the ways described herein. There may be a time delay from the time that the user device 102 detects the switch instruction and the time that the user device 102 is able to effectuate the switch and begin processing media content carried by the multicast stream. For example, the first frame of the media content program that the user device 102 may receive by way of the multicast stream may be frame sixty of the media content program. For playback of the media content program during the switch, the user device 102 may continue to use the buffered unicast content (e.g., frames fifty-five through fifty-nine of the buffered media content program). At this point, media content carried by the multicast stream may be accessed by the user device 102 and be available for processing (e.g., playback). The user device 102 may use either the buffered unicast content or the received multicast content (e.g., frames sixty through sixty-five) for playback of the media content program. In certain embodiments, the user device 102 may feed both the buffered unicast content and the received multicast content (e.g., frames sixty through sixty-five from each source) to a media player application executing on the user device 102. The media player application may be configured to sequentially order the frames for playback and may detect and ignore duplicate frames (i.e., frames having the same sequence numbers). Thus, the user device 102 may play back frames sixty through sixty-five of the media content program using either the buffered unicast content or the received multicast content (which source of content is used for playback may be determined by the media player application using a frame and ignoring a duplicate frame). At this point, the buffered unicast content runs out, and the user device 102 will use the received multicast content (e.g., frames sixty-six through one hundred) to continue to play back the media content program. In this or a similar manner, the switch from accessing the unicast stream to accessing the multicast stream carrying the media content program is able to be performed by the user device 102 such that the playback of the media content program is seamless and without interruption.

In certain embodiments, the user device 102 may be configured and/or instructed to buffer content after a switch instruction is detected. For example, the user device 102 may be configured and/or instructed to buffer content for a predefined length of time (e.g., 10-20 seconds), a predefined number of frames of content (e.g., 10-30 frames), or a predefined memory size (e.g., a number of bytes) after detection of the switch instruction. By buffering content after detection of the switch instruction, the user device 102 may ensure that sufficient buffered content is available to allow for the switch to be performed and playback of media content to be seamless across the switch.

To illustrate, the user device 102 may receive a unicast stream and buffer the stream content at a rate that is faster than the rate at which the content is played back. However, the user device 102 may be temporarily unable to buffer the stream content at a rate that is faster than the playback rate (e.g., because of connectivity issues and/or bandwidth constraints), and the playback may catch up to (or nearly catch up to) the buffering of the content. At this point, the user device 102 may receive an instruction to switch from accessing the unicast stream to accessing a multicast stream carrying the same content. If the user device 102 made the switch without continuing to buffer the unicast stream content after detecting the switch instruction, the buffer may not contain sufficient content to allow the user device 102 to effectuate a seamless switch. Accordingly, the user device 102 may continue to buffer the unicast stream content for a predefined period of time, a predefined number of frames, or a predefined memory size to ensure that sufficient buffer content is created to allow the user device 102 to effectuate a seamless switch.

The user device 102 may be configured and/or instructed in any suitable way to buffer content after a switch instruction is detected. In some examples, the user device 102 may be preconfigured to buffer content after a switch instruction is detected. In other examples, the user device 102 may be configured to communicate with media subsystem 104 in response to detection of the switch instruction to request and receive instructions for buffering content. Media subsystem 104 may respond to the request by sending buffering instructions to the user device 102. The instructions may indicate a length of time or a number of frames to buffer after detection of the switch instruction. In other examples, media subsystem 104 may be configured to send buffering instructions to the user device 102 in conjunction with the switch instruction. For example, media subsystem 104 may be configured to insert buffering instructions in a stream following an in-stream switch instruction. The user device 102 may be configured to receive and respond to the buffering instructions by buffering content in accordance with the instructions.

As part of making a switch from accessing one type of media content stream to accessing another type of media content stream, user devices 102 may be configured to communicate with media subsystem 104 in accordance with a predefined switch negotiation protocol in response to detection of a switch instruction. For example, a switch from accessing a first type of media content stream to accessing a second type of media content stream may include a user device 102 transmitting a request for access information for the second type of media content stream to media subsystem 104 over wireless network 106. The request may include access information for the first type of media content stream as a parameter. As described above, media subsystem 104 may respond to the request by using the parameter in the request to identify (e.g., by using a switch map data structure) and provide the requested access information for the second type of media content stream. The user device 102 may receive, from media subsystem 104 over wireless network 106, the access information for the second type of media content stream and use the access information for the second type of media content stream to access the second type of media content stream from media subsystem 104.

To illustrate, while accessing a unicast stream carrying a media content program, the user device 102 may detect an instruction to access a multicast stream carrying the media content program. In response, the user device 102 may transmit a request for access information for the multicast stream to media subsystem 104 over wireless network 106, receive the requested access information from media subsystem 104 over wireless network 106, and use the access information for the multicast stream to access the multicast stream. Additionally or alternatively, while accessing a multicast stream carrying a media content program, the user device 102 may detect an instruction to access a unicast stream carrying the media content program. In response, the user device 102 may transmit a request for access information for the unicast stream to media subsystem 104 over wireless network 106, receive the requested access information from media subsystem 104 over wireless network 106, and use the access information for the unicast stream to access the unicast stream.

Figure 3:
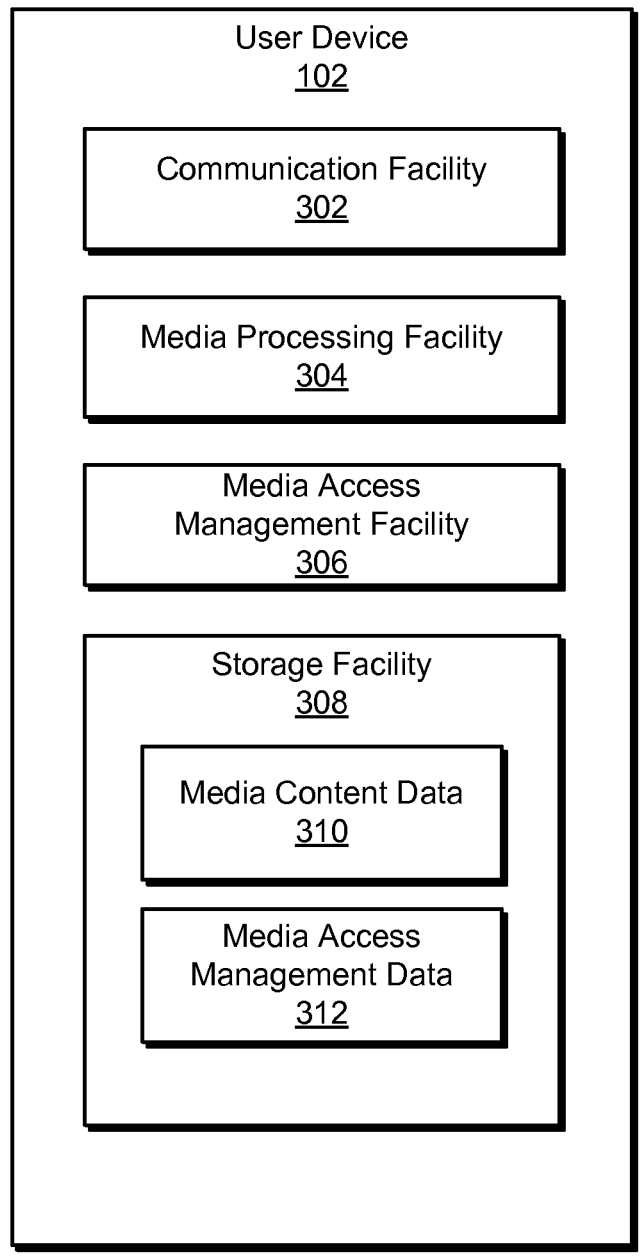
FIG. 3 illustrates exemplary components of a user device according to principles described herein.

FIG. 3 illustrates exemplary components of a user device 102. As shown, user device 102 may include a communication facility 302, a media processing facility 304, a media access management facility 306, and a storage facility 308, which may be in communication with one another using any suitable communication technologies.

Communication facility 302 may be configured to facilitate communications between user device 102 and media subsystem 104 using any communication technologies suitable to support the functionality of media user device 102 herein, including any of the exemplary communication technologies described above that may be used for accessing media content streams provided by media subsystem 104 by way of wireless network 106.

Media processing facility 304 may be configured to process media content, including by performing any of the exemplary user device media processing described herein on media content carried by a media content stream received from media subsystem 104 by way of wireless network 106. For example, media processing facility 304 may be configured to perform processing to present the media content for experiencing by a user 108 of user device 102. In certain examples, media processing facility 304 may included or be implemented by a media player application configured to run on a user device 102.

Media access management facility 306 may be configured to manage access of media content from media subsystem 104 over wireless network 106. For example, media access management facility 306 may be configured to monitor for and detect an instruction received from media subsystem 104 (e.g., within a media content stream being accessed by user device 102) to switch between accessing media content by way of one type of media content stream to accessing the media content by way of another type of media content stream (e.g., from accessing a unicast stream to accessing a multicast stream or vice versa) and, in response to the instruction, switch from accessing the first type of media content stream to accessing the second type of media content stream, as described herein. In some examples, media access management facility 306 may be configured to control buffering of stream content and providing of buffered content to media processing facility 304 for processing (e.g., for playback).

Media access management facility 306 may be configured to communicate with media processing facility 304 to facilitate performance of one or more operations of media access management facility 306. For example, media access management facility 306 may communicate with media processing facility 304 to access a media content stream being received by user device 120 in order to monitor the media content stream for a switch instruction. As another example, as part of a switch from accessing one type of media content stream to accessing another type of media content stream, media access management facility 306 may communicate with media processing facility 304 to direct media content processing facility 304 to access a particular media content stream.

Storage facility 308 may be configured to maintain media content data 310 representative of media content processed by media processing facility 304. Media content data 310 may represent live or buffered media content being received in one or more media content streams from media subsystem 104. Storage facility 308 may be further configured to maintain media access management data 312 representative of information received, generated, and/or maintained by media access management facility 306 in relation to managing access of media content (e.g., data representative of access information for use in accessing one or more media content streams provided by media subsystem 104. Storage facility 308 may maintain additional or alternative data, including any of the data disclosed herein.

Figure 4:
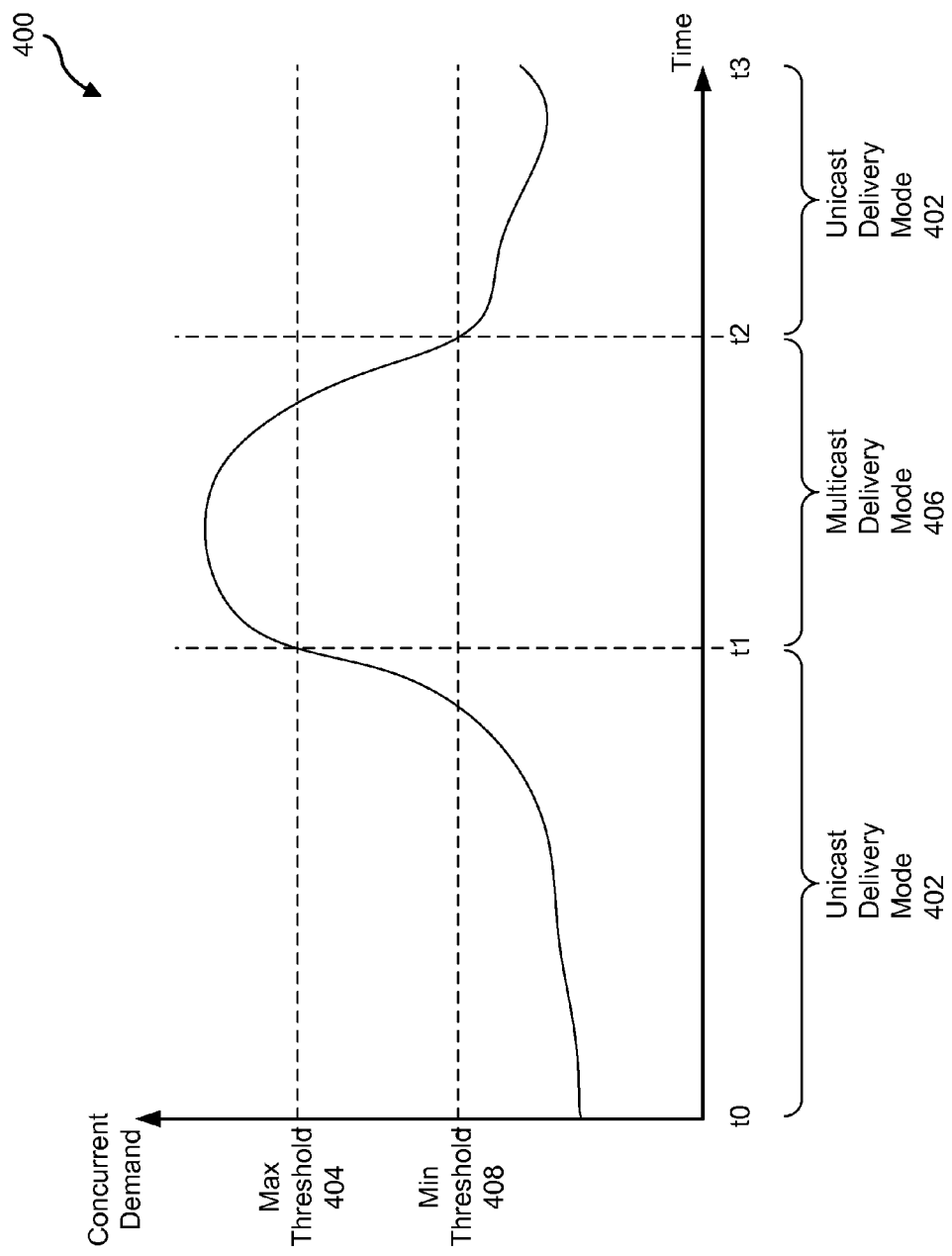
FIG. 4 illustrates a graph showing concurrent demand for media content plotted against time according to principles described herein.

To further illustrate the principles disclosed herein, a particular example will now be described. FIG. 4 illustrates a graph 400 showing concurrent demand (vertical axis) for a particular media content program (e.g., a live media content program) plotted against time (horizontal axis). As the concurrent demand for the media content program changes over time, system 100 may dynamically switch between unicast and multicast delivery of the media content program as described herein.

Figure 5:
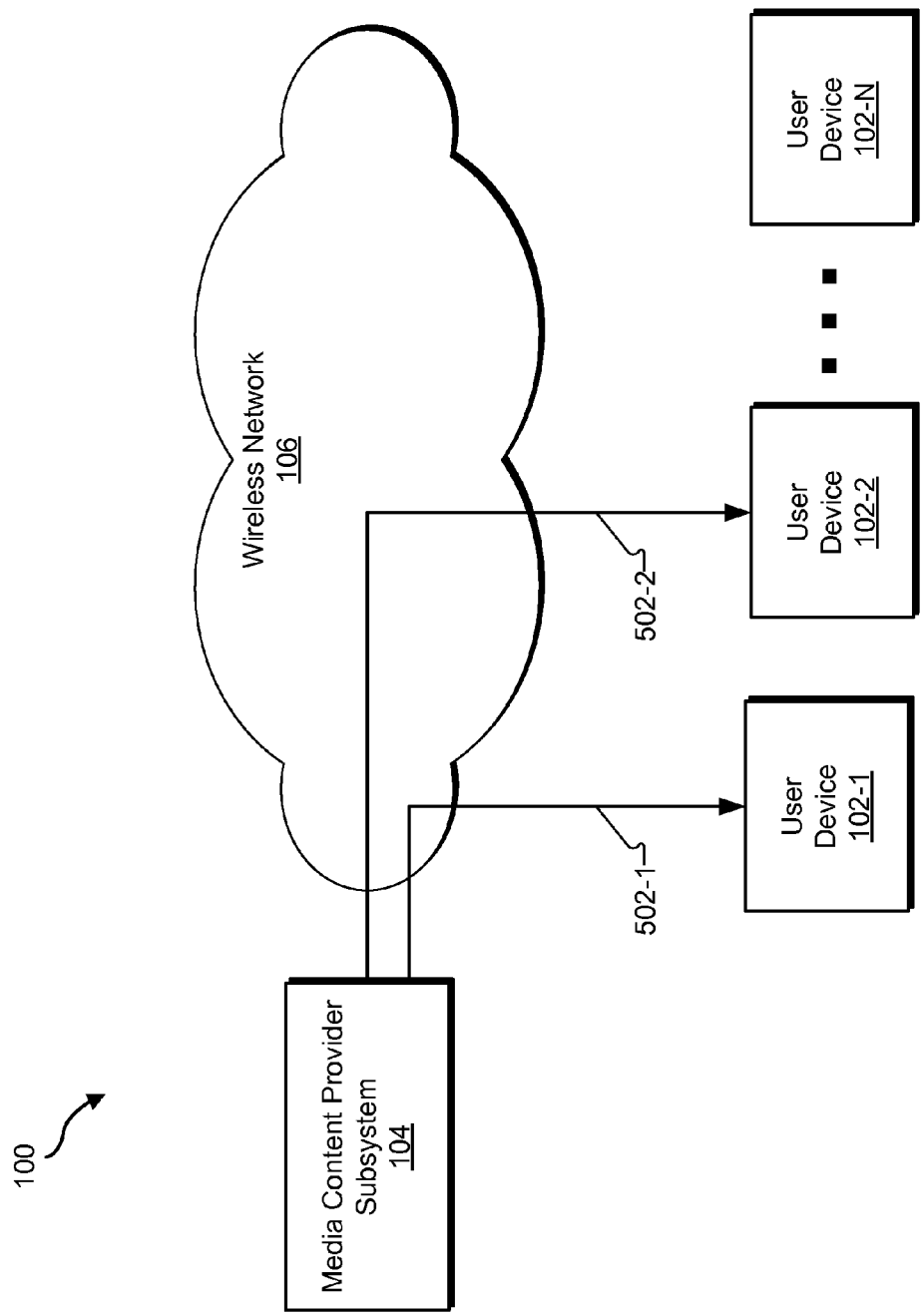
FIGS. 5-9 illustrate various examples of unicast delivery and multicast delivery of media content from a media content provider subsystem to one or more user devices according to principles described herein.

To illustrate, during a time period between time t0 and time t1 shown in FIG. 4, system 100 may operate in a unicast delivery mode 402. During this time period, one or more user devices 102 may access the media content program (e.g., a television program known as "Seinfeld") by way of one or more unicast streams carrying data representative of the media content program from media subsystem 104 to the one or more user devices 102. For example, FIG. 5 shows media subsystem 104 transmitting unicast streams 502-1 and 502-2 to user devices 102-1 and 102-2, respectively.

During the time period between time t0 and time t1, the concurrent demand for the media content program may increase as shown in FIG. 4. For example, a breaking news event may occur, and the original content of the media content program may be replaced with live news coverage of the breaking news event (e.g., "Seinfeld" content may be replaced with breaking news coverage content). As more people learn of the breaking news event and request access to the media content program over wireless network 106, the concurrent demand for the media content program may increase such that the concurrent demand for the media content program reaches or exceeds a predefined maximum demand threshold. In FIG. 4, the concurrent demand for the media content program reaches a predefined maximum demand threshold 404 at approximately time t1.

Figure 6:
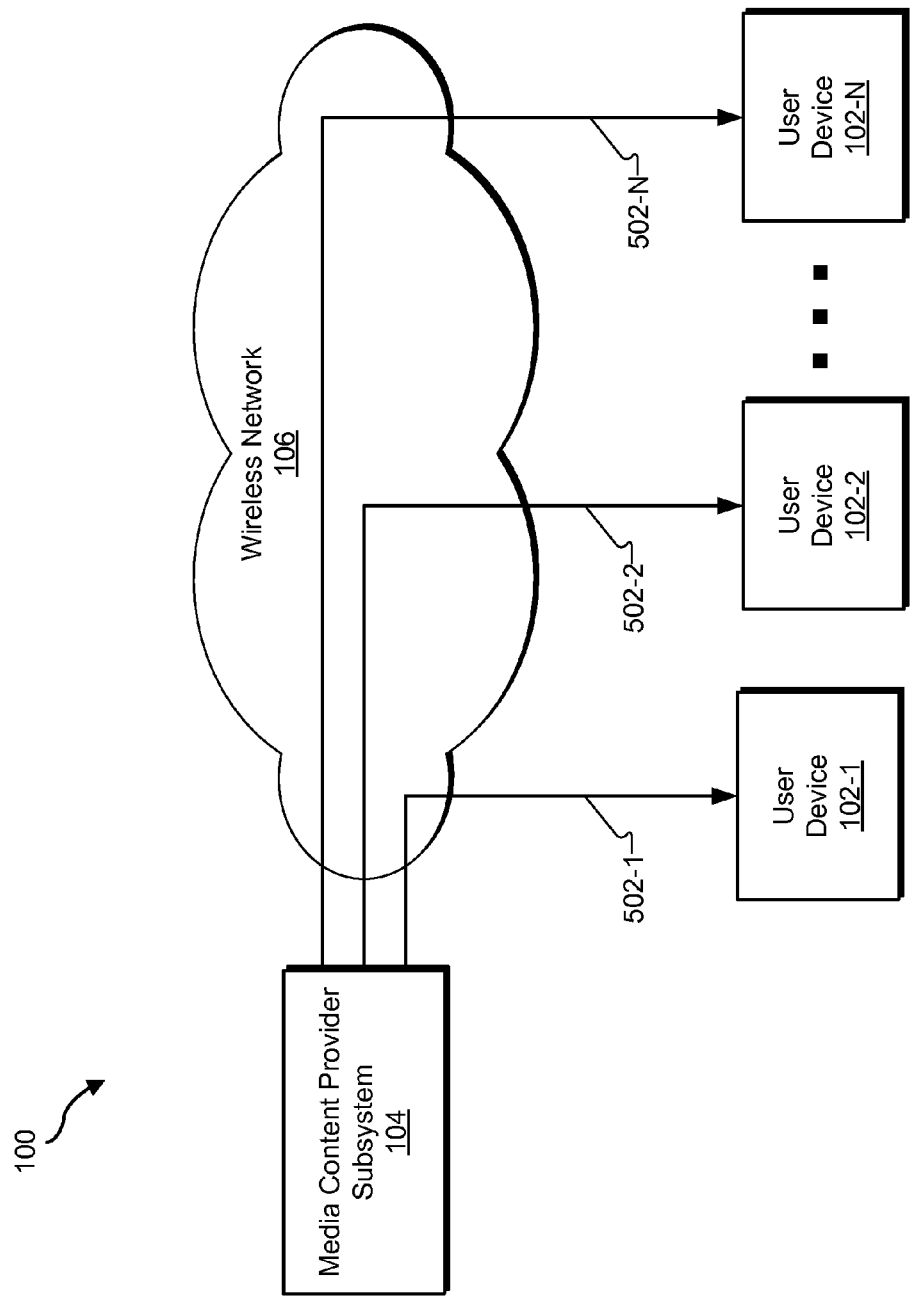

Up until time t1 when the concurrent demand for the media content program reaches or exceeds the predefined maximum demand threshold 404, system 100 may continue to operate in unicast delivery mode 402. Accordingly, during the time period between time t0 and time t1, media subsystem 104 provides an increased number of unicast streams to meet the increased demand for the media content program. FIG. 6 illustrates media system 104 transmitting unicast streams 502-1 through 502-N to user devices 102-1 through 102-N, respectively. With the transmission of N number of unicast streams 502, the concurrent demand for the media content program may reach or exceed the predefined maximum demand threshold 404.

Figure 7:
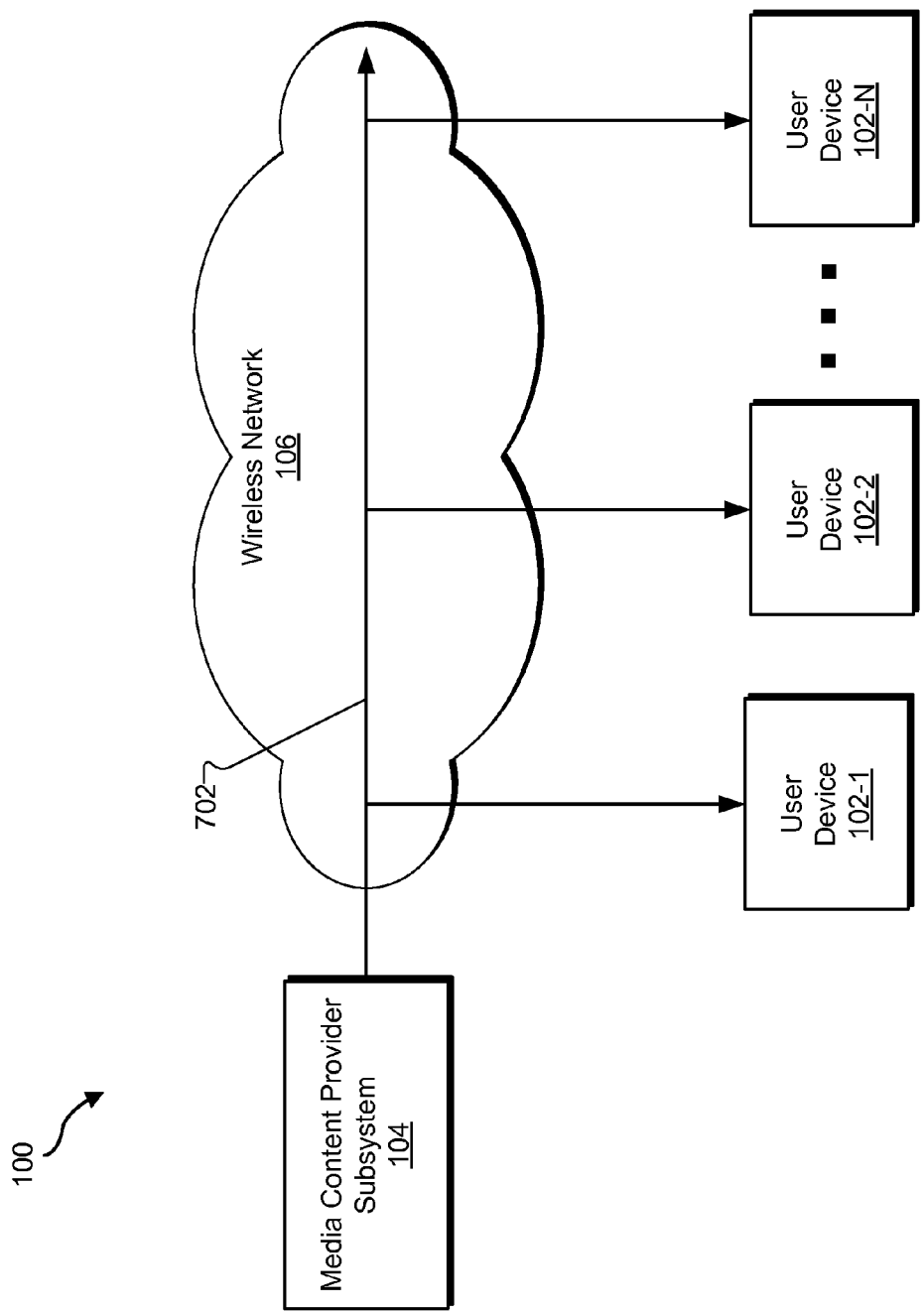

System 100 may detect that the predefined maximum demand threshold 404 has been reached or exceeded and may respond by dynamically switching from unicast delivery of the media content program to multicast delivery of the media content program over wireless network 106. To this end, system 100 may switch from unicast delivery mode 402 to a multicast delivery mode 406 at approximately time t1 as shown in FIG. 4. With the switch, system 100 may transition to transmitting a single multicast stream carrying the media content program in place of transmitting N number of unicast streams carrying the media content program. FIG. 7 illustrates system 100 after the switch from unicast delivery mode 402 to multicast delivery mode 406 has been made at approximately time t1. As shown in FIG. 7, media subsystem 104 may transmit a single multicast stream 702 carrying the media content program over wireless network 106, and user devices 102-1 through 102-N may access the multicast stream 702 to continue to access the media content program. As described herein, the transition from unicast delivery mode 402 to multicast delivery mode 406 may be seamless and transparent to the users of the user devices 102.

In addition, the transition from unicast delivery mode 402 to multicast delivery mode 406 may help conserve resources of system 100. For example, instead of media subsystem 104 transmitting N number of unicast streams 502 as shown in FIG. 6, media subsystem 104 operating in multicast delivery mode 406 transmits a single multicast stream 702 as shown in FIG. 7.

Figure 8:
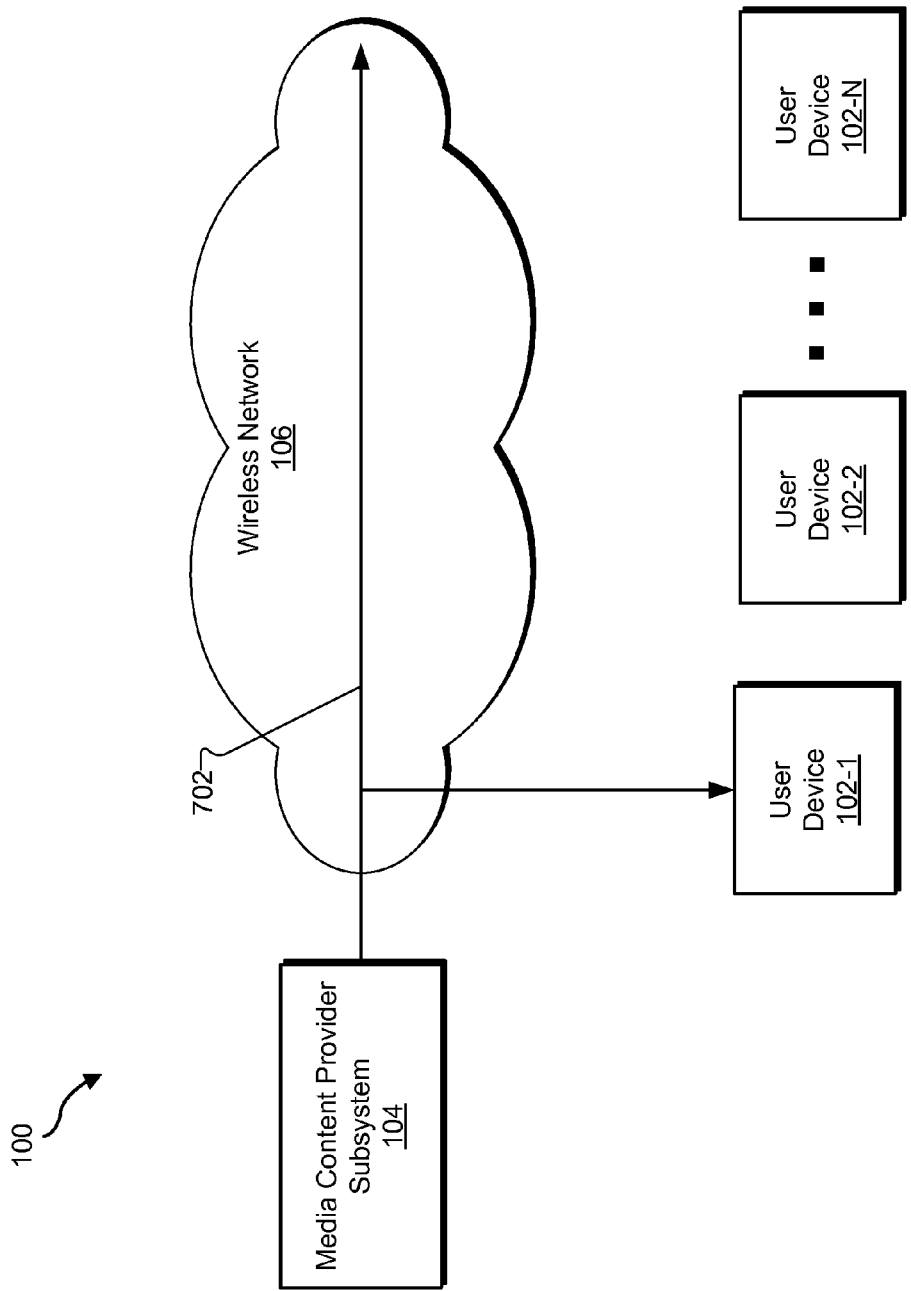

FIG. 4 further illustrates an exemplary time period between time t1 and time t2 during which system 100 may operate in multicast delivery mode 406 with respect to the media content program. During the time period between time t1 and time t2, the concurrent demand for the media content program may decrease. For example, the live coverage of the breaking news event may end or user interest in the live coverage of the breaking news event may subside during the time period. At approximately time t2, the concurrent demand for the media content program may reach or fall below a predefined minimum demand threshold 408 as shown in FIG. 4. For example, less users of user devices 102 may access multicast stream 702 provided by media subsystem 104, thereby causing the concurrent demand for the media content program to reach or fall below the predefined minimum demand threshold 408. FIG. 8 illustrates a decrease in concurrent demand from N number of user devices 102 accessing multicast stream 702 to user device 102-1 accessing multicast stream 702.

Figure 9:
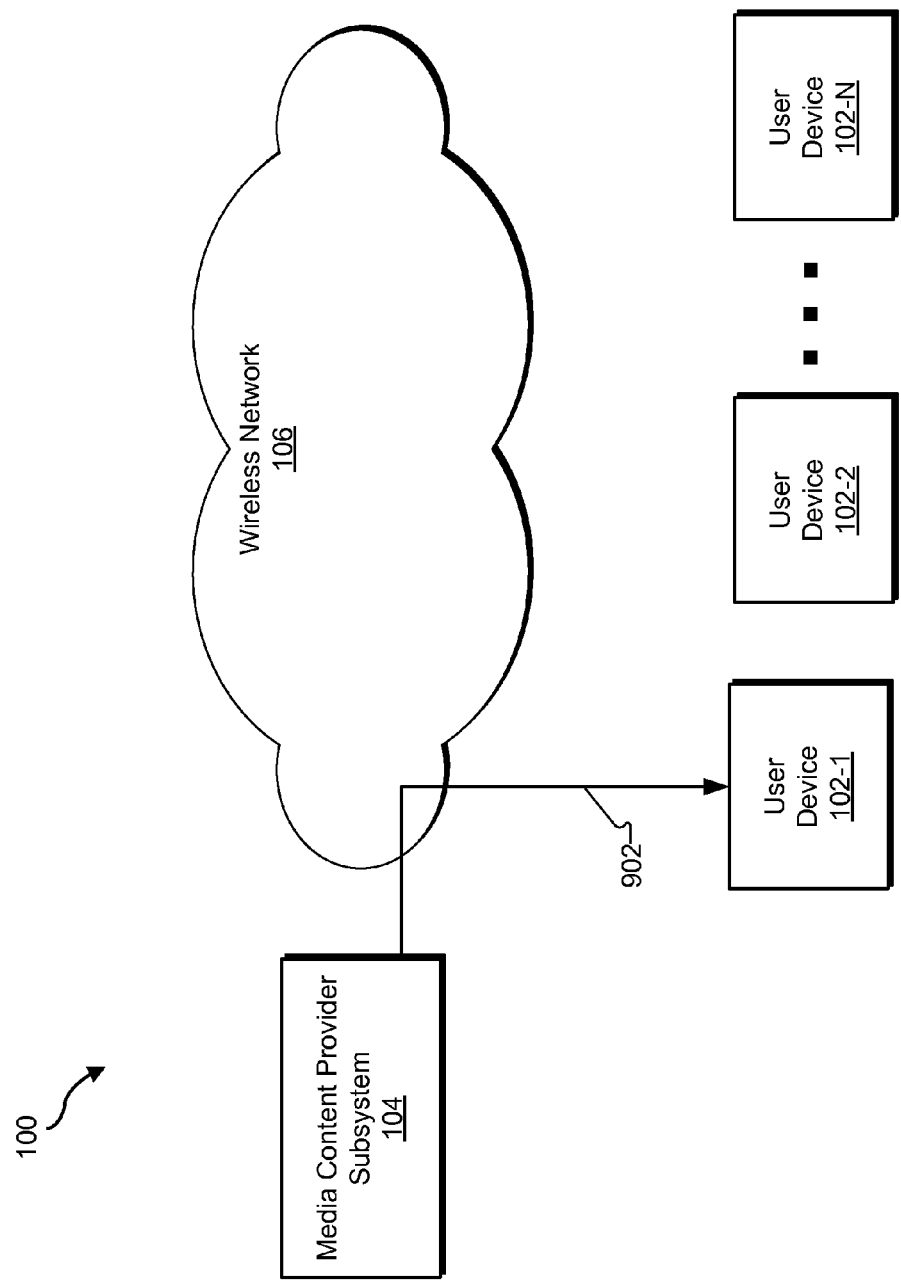

System 100 may detect that the concurrent demand for the media content program has reached or fallen below the predefined minimum demand threshold 408 in any suitable way. For example, media subsystem 104 may obtain data from network devices and use the data to determine the number of access devices 102 that are accessing multicast stream 702. In response to the detection of the concurrent demand having reached or fallen below the predefined minimum demand threshold, system 100 may dynamically switch from multicast delivery of the media content program to unicast delivery of the media content program, as described herein. For example, FIG. 4 shows that system 100 may switch from multicast delivery mode 406 to unicast delivery mode 402 at approximately time t2. With this switch, media subsystem 104 may transmit one or more unicast streams carrying the media content program instead of a single multicast stream carrying the media content program. For example, FIG. 9 illustrates media subsystem 104 transmitting a new unicast stream 902 to user device 102-1 after the switch from multicast delivery mode 406 to unicast delivery mode 402 has been made at approximately time t2.

In this or a similar manner, system 100 may dynamically switch between unicast and multicast delivery of media content to facilitate efficient use of resources of system 100, particularly in response to a spike in concurrent demand for the media content.

Figure 10:
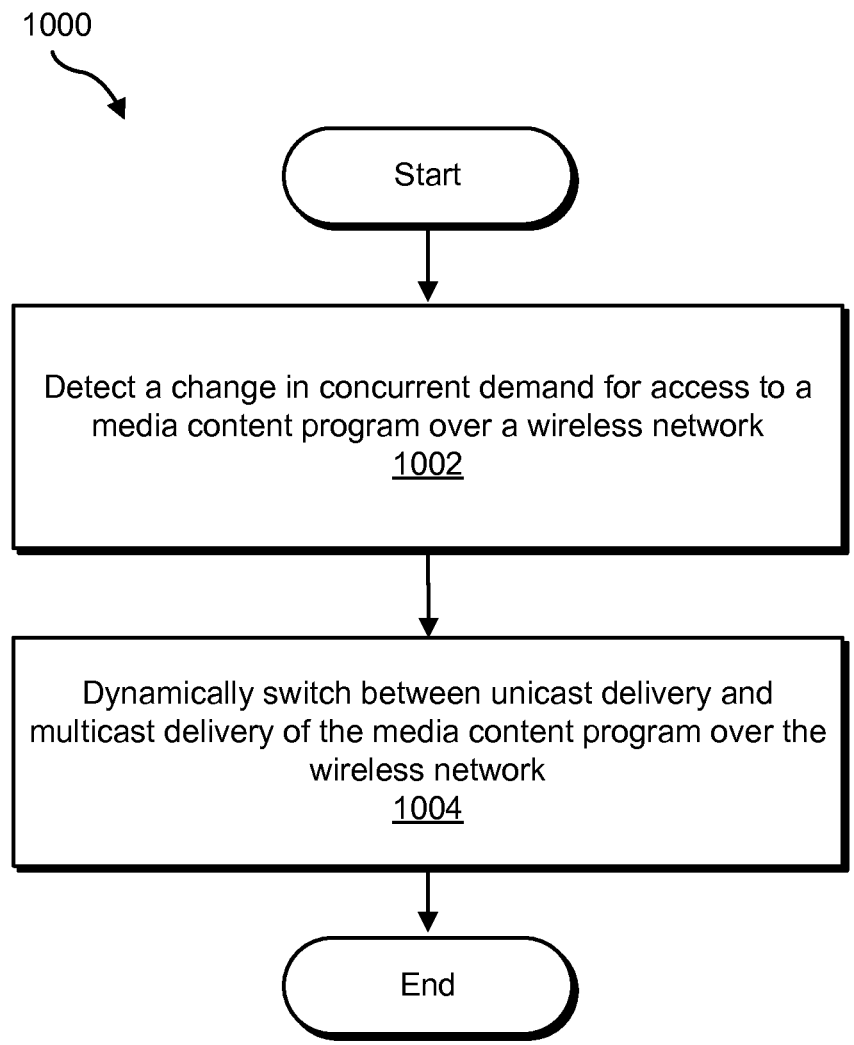
FIGS. 10-12 illustrate exemplary media content delivery methods according to principles described herein.
Figure 11:
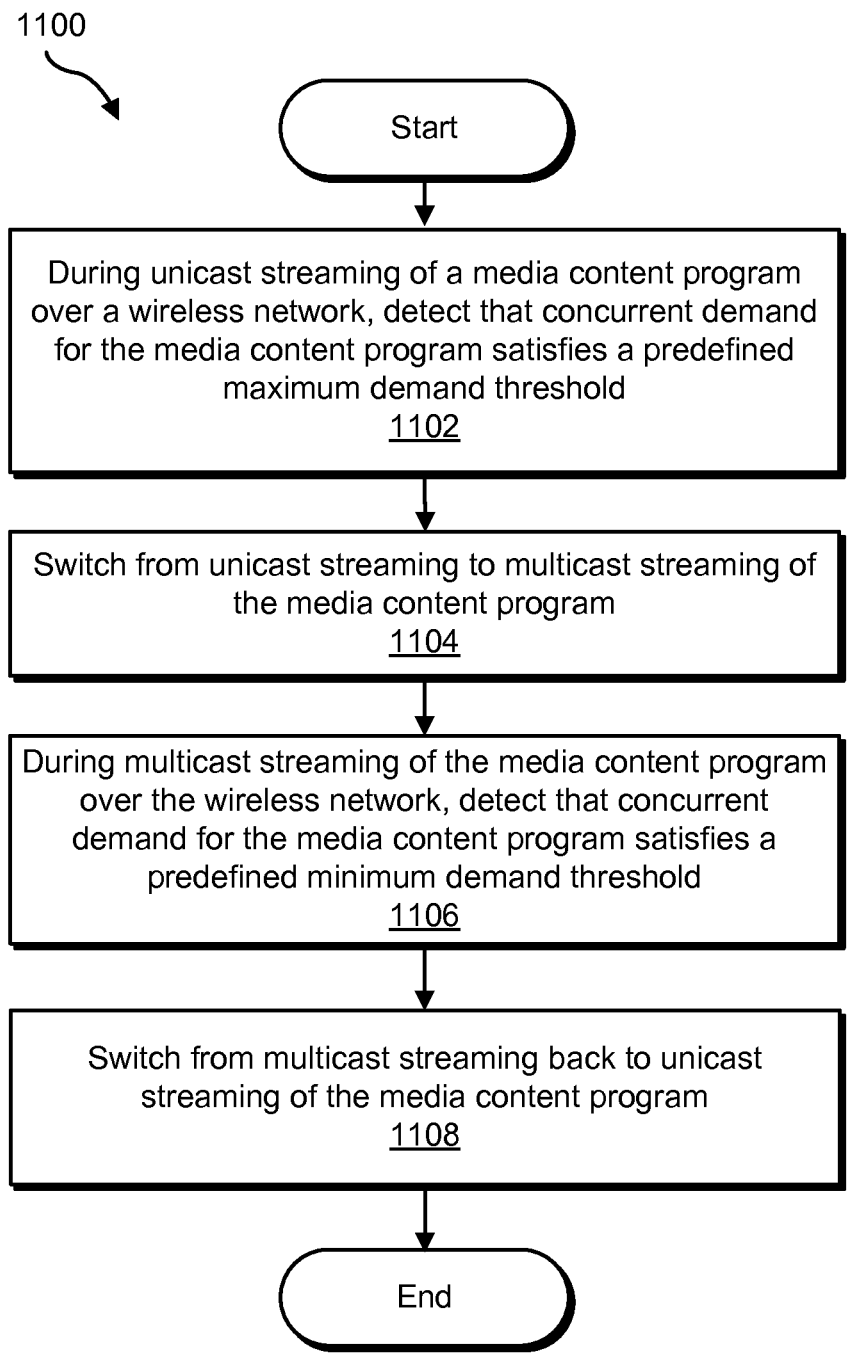
Figure 12:
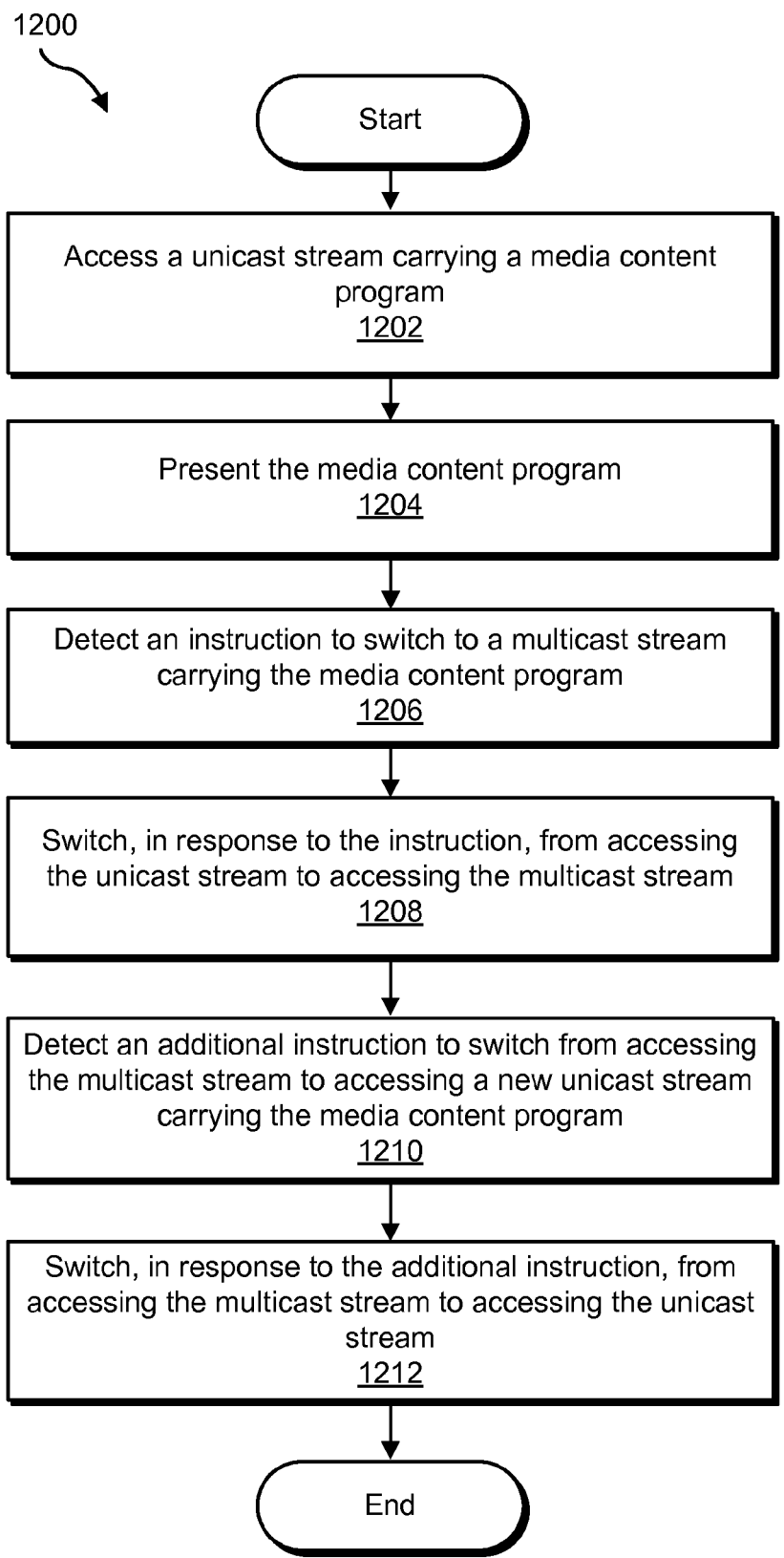

FIGS. 10-12 illustrate exemplary media content delivery methods according to principles described herein. While FIGS. 10-12 illustrate exemplary steps according to certain embodiments, other embodiments may omit, add to, reorder, combine, and/or modify any of the steps shown in FIGS. 10-12. In certain embodiments, one or more of the steps shown in FIGS. 10-12 may be performed by system 100 or one or more components of system 100.

Turning now to method 1000 shown in FIG. 10, in step 1002, system 100 may detect a change in concurrent demand for access to a media content program over a wireless network. For example, media subsystem 104 may detect a change in the concurrent demand for the media content program (e.g., an increase above a maximum demand threshold or a decrease below a minimum demand threshold) in any of the ways described herein.

In step 1004, system 100 may dynamically switch between unicast delivery and multicast delivery of the media content program over the wireless network. The dynamic switch may be performed in any of the ways described herein, including by using an in-stream instruction to instruct one or more user devices 102 accessing the media content program to switch between accessing the media program by way of unicast delivery and accessing the media program by way of the multicast delivery.

Turning now to method 1100 shown in FIG. 11, in step 1102, during unicast streaming of a media content program over a wireless network, system 100 may detect that concurrent demand for the media content program satisfies a predefined maximum demand threshold. For example, media subsystem 104 may detect that the concurrent demand for the media content program satisfies the predefined maximum demand threshold in any of the ways described herein.

In step 1104, system 100 may switch from unicast streaming to multicast streaming of the media content program. The switch may be performed in any of the ways described herein.

In step 1106, during multicast streaming of the media content program over the wireless network, system 100 may detect that concurrent demand for the media content program satisfies a predefined minimum demand threshold. For example, media subsystem 104 may detect that the concurrent demand for the media content program satisfies the predefined minimum demand threshold in any of the ways described herein.

In step 1108, system 100 may switch from multicast streaming to unicast streaming of the media content program. The switch may be performed in any of the ways described herein.

Turning now to method 1200 shown in FIG. 12, in step 1202, a user device 102 may access, over a wireless network, a unicast stream carrying data representative of a media content program. Step 1202 may be performed in any of the ways described herein.

In step 1204, user device 102 may present the media content program for experiencing by a user of the user device 102. Step 1204 may be performed in any of the ways described herein and may span one or more dynamic switches between unicast delivery and multicast delivery of the media content program.

In step 1206, user device 102 may detect an instruction to switch to a multicast stream carrying the media content program. For example, during the accessing of the unicast stream in step 1202, the user device 102 may detect, within the unicast stream, the instruction to switch to the multicast stream carrying data representative of the media content program, such as described herein.

In step 1208, the user device may switch, in response to the instruction, from accessing the unicast stream to accessing the multicast stream. Step 1208 may be performed in any of the ways described herein.

In step 1210, user device 102 may detect an additional instruction to switch from accessing the multicast stream to accessing a new unicast stream carrying the media content program. For example, during accessing of the multicast stream by the user device 102, the user device 102 may detect, within the multicast stream, the additional instruction to switch from accessing the multicast stream to accessing the new unicast stream carrying the media content program, such as described herein.

In step 1212, user device 102 may switch, in response to the additional instruction, from accessing the multicast stream to accessing the unicast stream by way of the wireless network. Step 1212 may be performed in any of the ways described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 13:
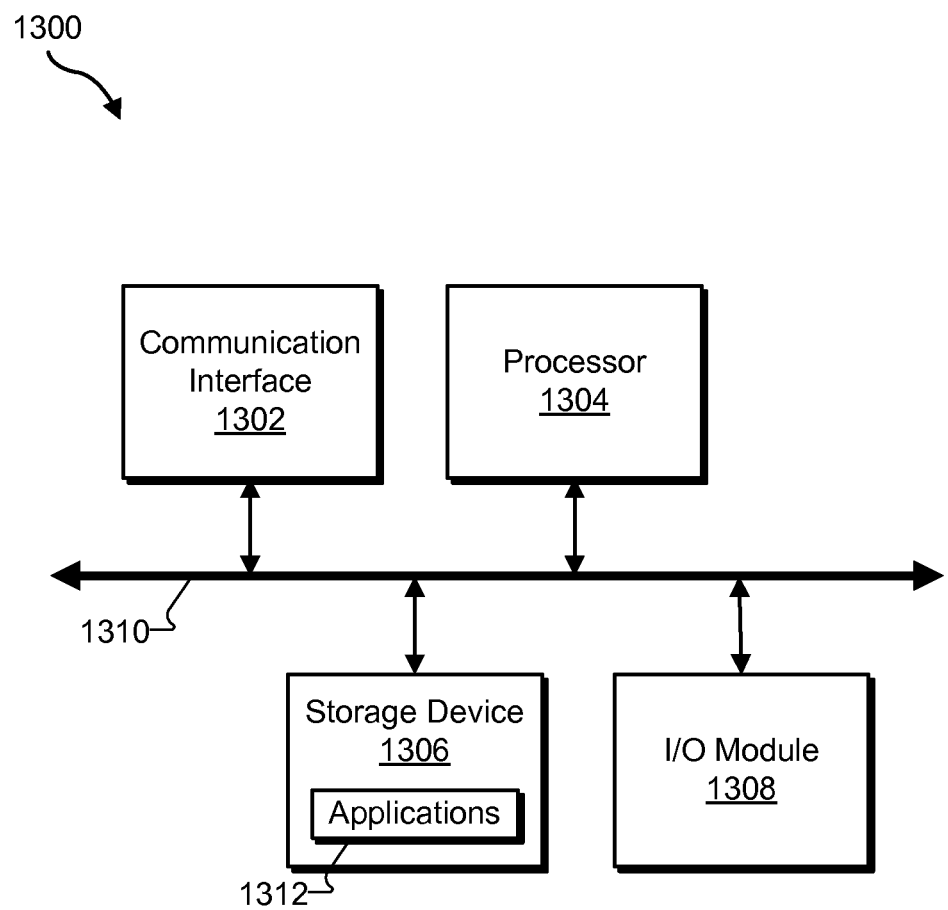
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, and any other suitable interface. Communication interface 1302 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1302 may be configured to interface with any suitable communication media, protocols, and formats.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another non-transitory computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with one or more of the facilities described herein. Likewise, one or more of the storage facilities described herein may be implemented by or within storage device 1306.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. While certain of the examples described herein are directed to switching from accessing a unicast stream to accessing a multicast stream, the principles also apply to switching from accessing a multicast stream to accessing a unicast stream. Similarly, while certain of the examples described herein are directed to switching from accessing a multicast stream to accessing a unicast stream, the principles also apply to switching from accessing a unicast stream to accessing a multicast stream. The description and drawings are accordingly to be regarded in an illustrative rather than a restrictive sense.

What is claimed is:

1. A method comprising:
accessing, by a user device over a wireless network, a unicast stream carrying data representative of a media content program;
detecting, by the user device during the accessing of the unicast stream, an instruction to switch to a multicast stream carrying data representative of the media content program;
switching, by the user device in response to the instruction, from the accessing of the unicast stream to accessing the multicast stream by way of the wireless network; and
presenting, by the user device, the media content program for experiencing by a user of the user device, wherein the presenting of the media content program is seamless across the switching from the accessing of the unicast stream to the accessing of the multicast stream,
wherein the instruction indicates a number of frames to buffer to ensure that the presenting of the media content program is seamless; and
buffering, by the user device, in response to the instruction, the number of frames of the media content program indicated in the instruction.

2. The method of claim 1, wherein the detecting comprises detecting the instruction within the unicast stream.

3. The method of claim 1, wherein the switching from the accessing of the unicast stream to the accessing of the multicast stream is transparent to a user of the user device.

4. The method of claim 1, wherein the switching from the accessing of the unicast stream to the accessing the multicast stream comprises:
transmitting, by the user device, a request for access information for the multicast stream to a media content provider subsystem over the wireless network, the request including access information for the unicast stream as a parameter;
receiving, by the user device from the media content provider subsystem over the wireless network, the access information for the multicast stream; and
using, by the user device, the access information for the multicast stream to access the multicast stream.

5. The method of claim 1, wherein:
the wireless network comprises a mobile phone network; and the user device comprises a mobile device associated with an end user of a media distribution service accessible by the mobile device over the mobile phone network.

6. The method of claim 1, further comprising:
detecting, by the user device during the accessing of the multicast stream, an additional instruction to switch to a new unicast stream carrying data representative of the media content program; and switching, by the user device in response to the additional instruction, from the accessing of the multicast stream to accessing the new unicast stream by way of the wireless network.

7. The method of claim 6, wherein the additional instruction is detected within the multicast stream.

8. The method of claim 6, wherein the switching from the accessing of the multicast stream to the accessing of the new unicast stream is transparent to a user of the user device.

9. The method of claim 6, wherein the switching from the accessing of the multicast stream to the accessing the new unicast stream comprises:
transmitting, by the user device, a request for access information for the new unicast stream to a media content provider subsystem over the wireless network, the request including access information for the multicast stream as a parameter;
receiving, by the user device from the media content provider subsystem over the wireless network, the access information for the new unicast stream; and using, by the user device, the access information for the new unicast stream to access the new unicast stream.

10. The method of claim 1, embodied as computer-executable instructions on at least one non-transitory computer-readable medium.

11. A method comprising:
detecting, by a media content provider subsystem during unicast streaming of a media content program over a wireless network, that concurrent demand for the media content program satisfies a predefined maximum demand threshold; and
switching, by the media content provider subsystem in response to the detecting that the concurrent demand for the media content program satisfies the predefined maximum demand threshold, from the unicast streaming of the media content program to multicast streaming of the media content program over the wireless network,
wherein the switching comprises providing, to one or more user devices over the wireless network, an instruction to switch from accessing one or more unicast streams carrying the media content program to accessing a multicast stream carrying the media content program, and
wherein the instruction indicates a number of frames of the media content program to be buffered by each of the one or more user devices to ensure a seamless presentation of the media content program across the switching.

12. The method of claim 11, wherein the providing comprises:
inserting the instruction in each of the one or more of the unicast streams; and
transmitting the one or more of the unicast streams containing the instruction to the one or more user devices.

13. The method of claim 11, wherein the switching comprises transmitting, by the media content provider subsystem over the wireless network, the multicast stream carrying the media content program.

14. The method of claim 13, wherein the transmitting of the multicast stream comprises broadcasting a broadcast stream within at least one cell of the wireless network.

15. The method of claim 11, further comprising:
detecting, by the media content provider subsystem during the multicast streaming of the media content program, that the concurrent demand for the media content program has subsided below a predefined minimum demand threshold; and
switching, by the media content provider subsystem in response to the detecting that the concurrent demand for the media content program has subsided below a predefined minimum demand threshold, from the multicast streaming of the media content program back to the unicast streaming of the media content program over the wireless network.

16. The method of claim 15, wherein the switching from the multicast streaming of the media content program to the unicast streaming of the media content program comprises providing, to the one or more user devices over the wireless network, an instruction to switch from accessing the multicast stream to accessing one or more new unicast streams over the wireless network.

17. The method of claim 16, wherein the providing comprises:
inserting the instruction in the multicast stream; and
transmitting the multicast stream containing the instruction over the wireless network.

18. The method of claim 16, further comprising:
receiving, by the media content provider subsystem over the wireless network in response to the providing of the instruction to the one or more user devices, one or more requests from the one or more user devices to access the one or more new unicast streams; and
transmitting, by the media content provider subsystem over the wireless network in response to the one or more requests, the one or more new unicast streams carrying the media content program to the one or more user devices.

19. The method of claim 11, embodied as computer-executable instructions on at least one non-transitory computer-readable medium.

20. A method comprising:
detecting, by a media content delivery system, a change in concurrent demand for access to a media content program over a wireless network; and
dynamically switching, by the media content delivery system, between unicast delivery and multicast delivery of the media content program over the wireless network in response to the detecting of the change in the concurrent demand for access to the media content program;
wherein the dynamically switching comprises using an in-stream instruction to instruct one or more user devices accessing the media content program to switch between accessing the media content program by way of the unicast delivery of the media content program and accessing the media content program by way of the multicast delivery of the media content program, and
wherein the in-stream instruction indicates a number of frames of the media content program to be buffered by each of the one or more user devices to ensure that the dynamically switching is seamless.

21. The method of claim 20, wherein: the change in the concurrent demand comprises an increase in the concurrent demand that satisfies a predefined maximum demand threshold; and the dynamically switching comprises switching from unicast delivery to multicast delivery of the media content program over the wireless network.

22. The method of claim 20, wherein:
the change in the concurrent demand comprises a decrease in that concurrent demand that satisfies a predefined minimum demand threshold; and the dynamically switching comprises switching from multicast delivery to unicast delivery of the media content program over the wireless network.

23. A system comprising:
at least one processor; and a media delivery management facility configured to direct the at least one processor to detect a change in concurrent demand for access to a media content program over a wireless network, and dynamically switch between unicast delivery and multicast delivery of the media content program over the wireless network in response to the detecting of the change in the concurrent demand for access to the media content program;

wherein the dynamic switch includes using an in-stream instruction to instruct one or more user devices accessing the media content program to switch between accessing the media content program by way of the unicast delivery of the media content program and accessing the media content program by way of the multicast delivery of the media content program, and wherein the in-stream instruction indicates a number of frames of the media content program to be buffered by each of the one or more user devices to ensure that the dynamic switch is seamless.

* * * * *